United States Patent [19]

Matsuoka

[11] Patent Number: 5,513,731
[45] Date of Patent: May 7, 1996

[54] TORSIONAL VIBRATION DAMPING DEVICE OF TORQUE CONVERTER

[75] Inventor: Yoshihiro Matsuoka, Neyagawa, Japan

[73] Assignee: Kabushiki Kaisha Daikin Seisakusho, Osaka, Japan

[21] Appl. No.: 274,787

[22] Filed: Jul. 14, 1994

[30] Foreign Application Priority Data

Jul. 16, 1993 [JP] Japan .................................. 5-039038

[51] Int. Cl.$^6$ .............................. F16H 45/02; F16D 3/80
[52] U.S. Cl. ...................... 192/3.29; 192/55.4; 192/208; 464/24
[58] Field of Search ................................ 192/3.28, 3.29, 192/3.3, 106.1, 106.2, 55.4, 55.61, 208, 212; 464/24, 68

[56] References Cited

U.S. PATENT DOCUMENTS

| | | | |
|---|---|---|---|
| 4,565,273 | 1/1986 | Tojima et al. | 192/106.2 |
| 5,180,044 | 1/1993 | Fukushima et al. | 192/106.1 |
| 5,240,457 | 8/1993 | Leichliter et al. | 192/106.1 X |
| 5,355,747 | 10/1994 | Kajitani et al. | 192/106.1 X |
| 5,386,896 | 2/1995 | Matsuoka | 192/3.29 |

*Primary Examiner*—Richard M. Lorence
*Attorney, Agent, or Firm*—Shinjyu Office of Patent Attorneys

[57] ABSTRACT

A torsional vibration damping device is disposed between an input front cover and a torque converter body for damping torsional vibration transmitted to an output member from an input member. The device includes a pair of side plates 20 and 21, a pair of cases 22 and 23. and a slider 25. The pair of side plates 20 and 21 are coupled together but spaced apart from one another and define an annular chamber therebetween. A piston 11 is coupled to the plates for axial movement but restricted from movement in a radial direction with respect to the plates. The pair of cases 22 and 23 is disposed between the side plates 20 and 21 within the annular chamber defining an arcuate chamber 24. The slider 25 is connectable to a driven plate 12 and is slidably disposed in the fluid chamber 24. Thee outer surfaces of the slider and tile inner surfaces of the fluid chamber 24 define a choke which restricts tile flow of fluid around the slider as it moves within the chamber. The cases 22 and 23 have overlapping portions which are pressed against each other by the pressure of tile fluid created Inside of the fluid chamber 24 in its radially outer portion.

5 Claims, 5 Drawing Sheets

1

TORSIONAL VIBRATION DAMPING DEVICE OF TORQUE CONVERTER

BACKGROUND OF THE INVENTION

The present invention relates generally to a torsional vibration damping device used in, for instance, a torque converter having a lock-up mechanism. The invention further relates to a damping device disposed between an input member and an output member of tile torque converter for damping vibration transmitted to the output member from the input member upon engagement of tile lock-up mechanism.

A typical torque converter generally includes an annular housing (an input member), an impeller attached to the housing, and a turbine and a stator disposed within tile housing. When the torque converter is used in an automotive application, the annular housing is coupled to the drive shaft of the automobile engine for rotation therewith. The turbine is usually connected to an output member or hub which couples to the input shaft of an automatic transmission for transmitting torque thereto. As the drive shaft of the engine rotates, rotation of the torque converter housing causes the impeller to urge fluid into the blades of tile turbine. In response to the movement of the fluid, the turbine rotates and transmits torque to tile automatic transmission.

Some torque converters are provided with a lock-up device disposed between the turbine and a front cover. When the lock-up device is engaged, torque is directly transmitted through the lock-up device from the front cover to tile output member. One such lock-up device includes an elastic member such as a torsion spring disposed between the output member and the lock-up device that absorbs some of the shock produced when the lock-up device engages. However, the conventional torsion spring arrangement used in lock-up devices provides only a low level of rigidity absorbing only slight vibrations transmitted at low speed levels and cannot absorb low frequency vibration experienced at higher speed levels.

In order to solve the above described problem, the applicant of the present invention has considered a lock-up device in which a viscous damping mechanism is provided in parallel with an elastic or spring type damping mechanism. The viscous damping device includes a circumferentially extending case, the case defining a fluid chamber and a slider disposed so as to be circumferentially movable in the chamber. Fluid (hydraulic fluid in the torque converter) flows through a clearance between the case and the slider when the case and the slider are relatively rotated, to produce a desired damping effect by resistance in the clearance.

In this lock-up device, slight vibration in a low speed area is absorbed by the elastic connecting mechanism having a torsion spring low in rigidity, and low-frequency vibration in a high speed area is absorbed by the viscous damping mechanism for producing large hysteresis torque in the high speed area.

However, In the viscous damping device, if excess hydraulic fluid pressure created In the fluid chamber, clearance between the slider and the case can increase. If this clearance is increased, the amount of hydraulic fluid leaking out of the fluid chamber is increased, thereby to make it Impossible to obtain desired damping response.

SUMMARY OF THE INVENTION

An object of the present invention is to enhance sealing properties of a fluid chamber in a viscous damping device to obtain improved hysteresis torque responses.

In one aspect of the present invention, a fluid filled torque converter housing includes first and second turbine elements disposed therein, the first turbine element connected to the torque converter housing for rotation therewith, and the second turbine element being rotatably disposed adjacent to the first turbine element. The second turbine element is coupleable to the input shaft of an automatic transmission.

A driven plate connected to the second turbine element, the plate having a plurality of radially extending projections formed on an outer circumferential edge. A first and second housing members are connected to the driven plate member for limited rotary displacement, portions of the housing members partially defining an annular chamber. A first set of case members and a second set of case members are disposed within the annular chamber, each corresponding pair of one first case member and one second case member each having overlapping portions defining an arcuate fluid chamber, each arcuate chamber having a plurality of inner surfaces.

A slider element is slidably disposed within each arcuate fluid chamber dividing each arcuate fluid chamber into two sub-chambers. Each of the plurality of projections on the driven member engages one of the sliders. The surfaces of each slider and the corresponding inner surfaces of each arcuate chamber define a choke for restricting fluid flow between the corresponding sub-chambers in response to rotary displacement between the housing members and driven plate.

A lock-up member is coupled to the housing members to rotate therewith and is selectively engagable with the input member. The damping mechanism, which includes the slider and arcuate chamber, damps vibration experienced when the lock-up member engages the input member.

In another aspect of the present invention, an annular seal member is disposed on an outer radial portion of the driven plate proximate the case members, the seal member being formed with a plurality of apertures through which each of a corresponding one of the driven plate projections extends. The seal member provides for additional scaling of fluid within the sub-chambers.

Another aspect of the present invention, at least one restraining member is rigidly connected to the first and second housing members maintaining the housing members in a generally constant spaced apart relationship, the housing members restraining the case members from axially movement. The restraining member restrains the case members from radial movement with respect to the housing members.

The foregoing and other objects, aspects and advantages of the present invention will become more apparent from the following detailed description.

DESCRIPTION OF THE PREFERRED EMBODIMENTS

Figure 1:
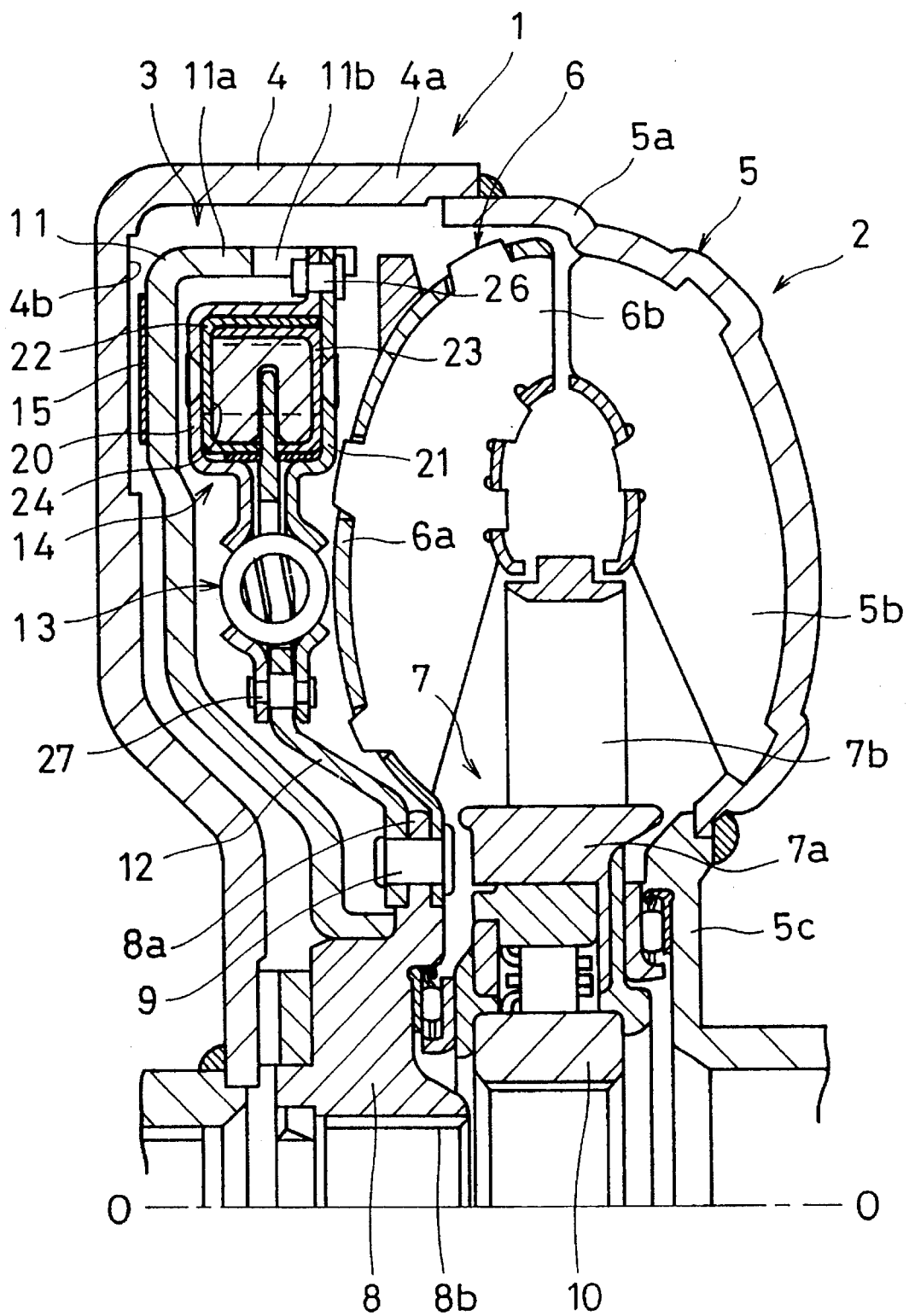
FIG. 1 is a partial longitudinal sectional view showing a torque converter employing one embodiment of the present invention.

In FIG. 1 showing a torque converter 1 employing one embodiment of the present invention, a line 0—0 represents a rotational axis of the torque converter 1.

The torque converter 1 is mainly composed of a torque converter body 2 and a lock-up device 3. A front cover 4 is connectable to, for instance, a rotatable drive shaft (not shown) of an internal combustion engine side (not shown). The cover 4 has a cylindrical projection on 4a axially projected in its radially outer portion. The projection 4a is fixed to an impeller shell 5a of an impeller 5. The front cover 4, together with the impeller shell 5a, forms a hydraulic fluid chamber filled with hydraulic fluid.

The torque converter body 2 is mainly composed of the impeller 5, a turbine 6 driven by the flow of fluid from the impeller 5, and a seater 7.

The impeller shell 5a of the impeller 5 has its radially inner end fixed to an impeller hub 5c. A plurality of impeller blades 5b are fixed to the inside of the impeller shell 5a. The turbine 6 is disposed in a position opposing the impeller 5. The turbine 6 is constituted by a turbine shell 6a and a plurality of turbine blades 6b fixed to the turbine shell 6a. The turbine shell 6a has its radially inner end fixed to a flange 8a of a turbine hub 8 (an output member) by a plurality of rivets 9. The turbine hub 8 has a spline hole 8b engaged with an input shaft (not shown) of a transmission in its radially inner portion.

The stator 7 is disposed between the radially inner portion of the impeller 5 and the radially inner portion of the turbine 6. The stator 7 is for adjusting the direction of the hydraulic fluid which is returned to the impeller 5 from the turbine 6 to increase the torque ratio, and is constituted by an annular stator carrier 7a and a plurality of stator blades 7b provided on a radially outer surface of the stator carrier 7a. The stator carrier 7a is connected to an inner race 10 through a one-way clutch mechanism. The inner race 10 is connected to a fixed shaft (not shown) extending from the housing side (the right side of FIG. 1).

The lock-up device 3 is disposed between the front cover 4 and the turbine 6. The lock-up device 3 comprises a disc-shaped piston 11 (an input member), a driven plate 12, an elastic connecting mechanism 13 for elastically connecting the piston 11 and the driven plate 12, and a torsional vibration damping device 14 for damping torsional vibration between the piston 11 and the driven plate 12.

The piston 11 has its radially inner end supported on a radially outer surface of the turbine hub 8 so as to be axially and circumferentially slidable. An annular friction member 15 is bonded to a surface of a radially outer portion of the piston 11 opposite to a friction surface 4b of the front cover 4. The piston 11 has a cylindrical outer wall 11a extending axially toward the converter body 2 (rightward in FIG. 1). A plurality of notches 11b are formed with equal spacing in the circumferential direction on the outer wall 11a.

Figure 2:
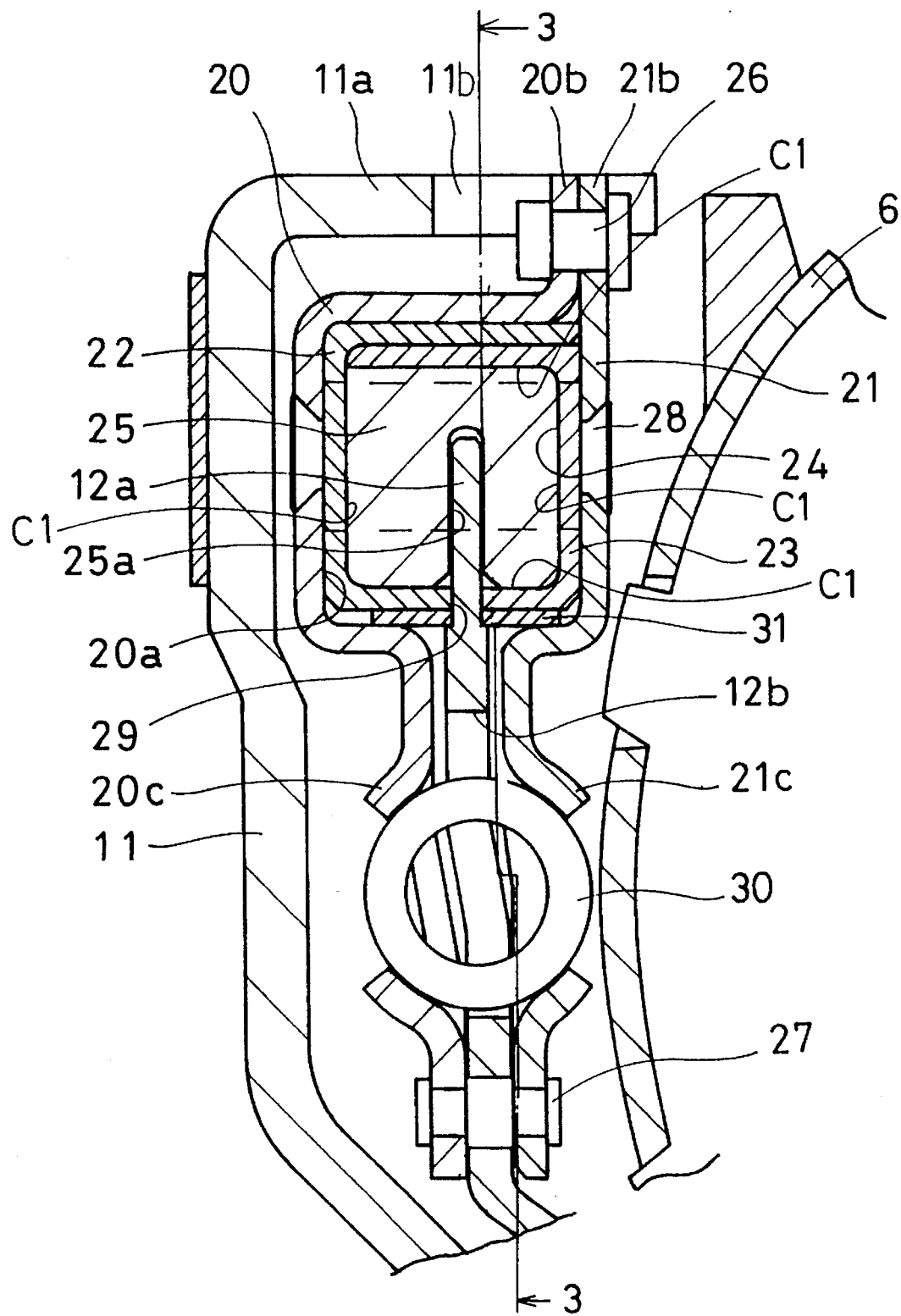
FIG. 2 is a partial enlarged view of a portion of FIG. 1.

The torsional vibration damping device 14 is mainly composed of a pair of first and second side plates 20 and 21 disposed with predetermined spacing, a pair of first and second cases 22 and 23 forming a fluid chamber 24, arid a slider 25 slidably disposed inside of the fluid chamber 24, as shown in FIGS. 1 and 2.

Figure 3:
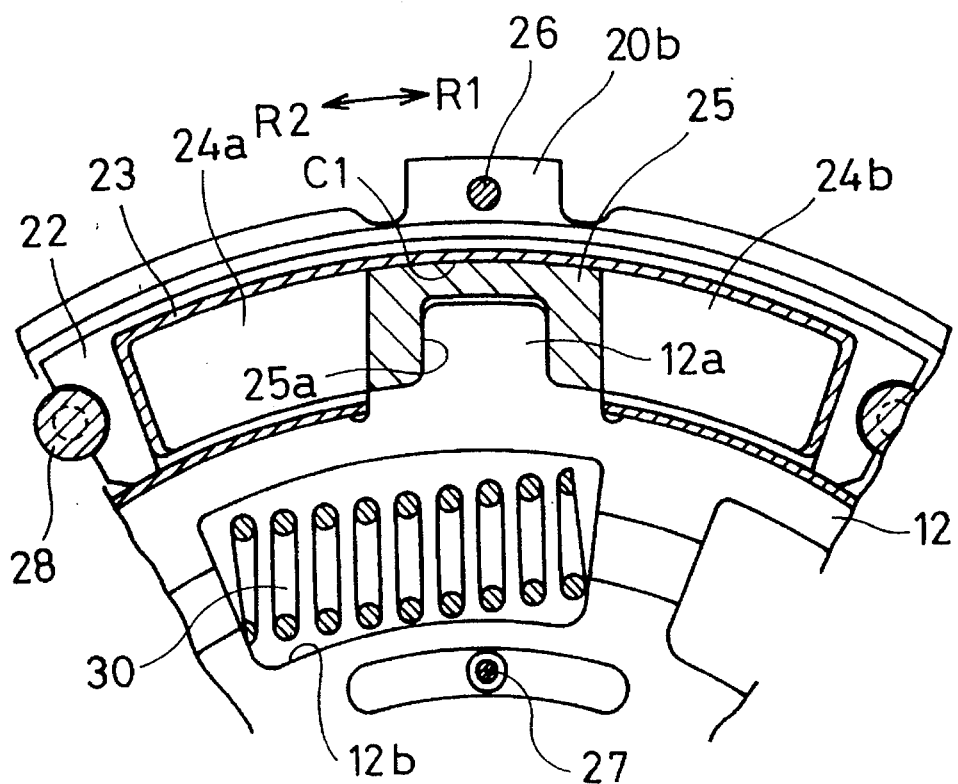
FIG. 3 is a partial section taken along the line 3—3 in FIG. 2 looking in the direction of the arrows.

The first side plate 20 and the second side plate 21 respectively have projections 20b and 21b formed with predetermined spacing in the circumferential direction in their radially outer portions (see FIGS. 2 and 3). The projections 20b and 21b are fixed to each other by a plurality of rivets 26, and are engaged with the notches 11b of the piston 11 so as to be axially slidable. In additions, radially inner ends of both the side plates 20 and 21 arc fixed to each other by a stopper pin 27. The stopper pin 27 has an elongated body of a predetermined length. The axial spacing between radially inner portions of the pair of side plates 20 and 21 is determined by the length of the pin 27. The plate 20 has an inverted "J" shape in cross section, as is described below with respect to FIG. 5. The inner portion of the inverted "J" shape of the plate 20 defines a wide groove 20a which extends radially around the outer portion of the first side plate 20.

The first case 22 and the second case 23 are disposed in the groove 20a between the plates 20 and 21. A stud pin 28 is fixed to the plates 20 and 21 and extends through the groove 20a fixing the cases 22 and 23 to the plates 20 and 21, as is described further below. The axial spacing between the plates 20 and 21 along the groove 20a is regulated by the stud pin 28.

Figure 4:
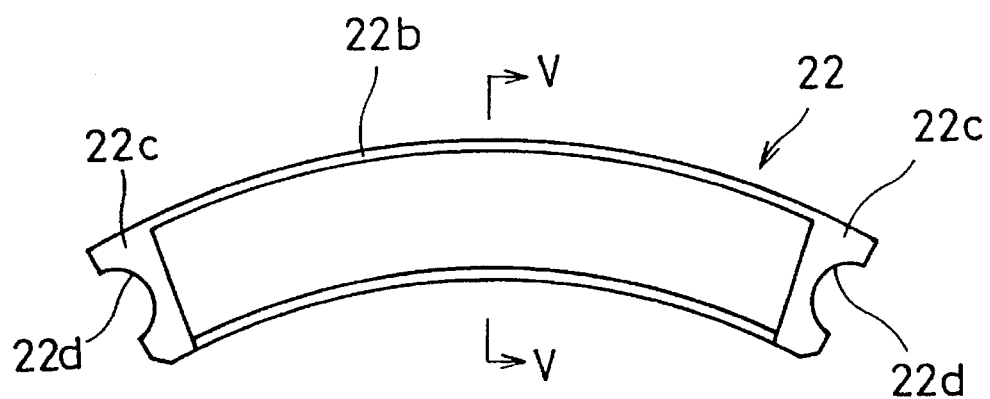
FIG. 4 is a front view of a first element used to form a fluid chamber in the present invention shown removed from the damping device depicted in FIGS. 1–3.
Figure 5:
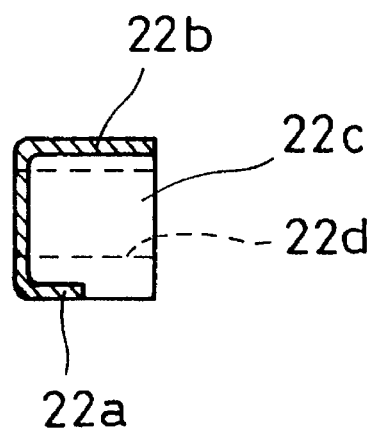
FIG. 5 is a cross sectional view taken along a line V—V in FIG. 4.

The first case 22 is formed in a circular arc shape as shown in FIG. 4, and is an inverted "J" shape in cross section, as shown in FIG. 5. A side surface of the first case 22 on the side of the second case 23 is opened, and the axial length of a lower wall 22b is approximately one half the axial length of an upper wall 22b. Further, supporting blocks 22c are formed in both ends in the circumferential direction of the first case 22. A semicircular notch 22d through which the stud pin 28 is inserted is formed in the supporting block 22c.

Figure 6:
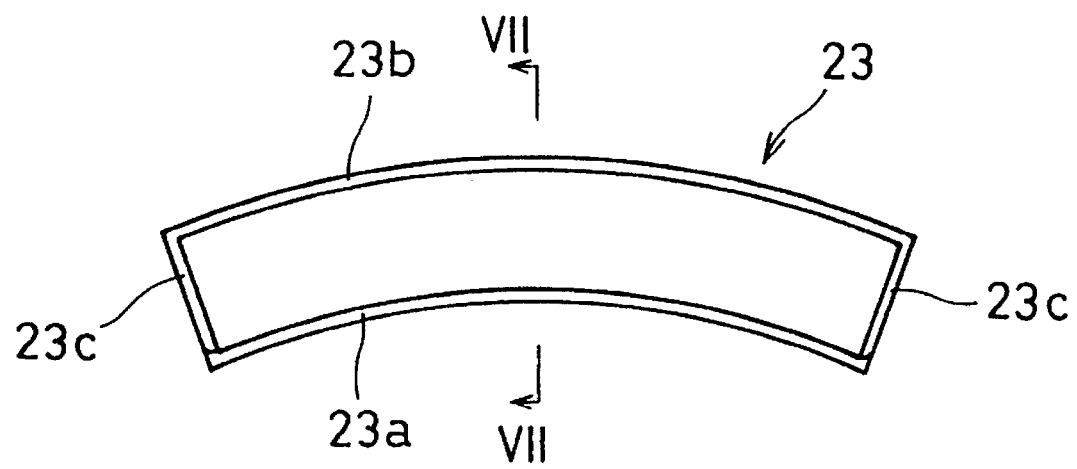
FIG. 6 is a front view of a second element used to form a fluid chamber in the present invention shown removed from the damping device depicted in FIGS. 1–3.
Figure 7:
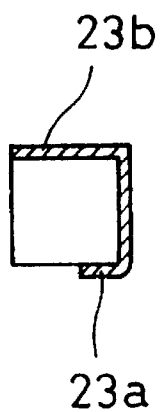
FIG. 7 is a cross sectional view taken along a line VII—VII in FIG. 6.

The second case 23 has a circular arc shape as shown in FIG. 6 and has a "J" shape in cross section, as shown in FIG. 7. The axial length of a lower wall 23a is approximately one half the axial length of an upper wall 23b. In the assembled state, the upper wall 23b and walls 23c in ends in the circumferential direction of the second case 23 are inserted into the first case 22, and the upper wall 23b adheres to the upper wall 22b of the first case 22, to form an overlapped portion. In addition, an opening 29 having a predetermined clearance (see FIG. 2) is formed between the lower walls 22a and 23a of the cases 22 and 23.

The slider 25 is inserted between the cases 22 and 23 so as to be circumferentially slidable inside of the fluid chamber 24, as shown in FIG. 3. The fluid chamber 24 is divided into division chambers 24a and 24b by the slider 25. A notch 25a is formed in a central portion of the slider 25 and receives a protrusion 12a of the plate 12 (described below). A choke C1 is formed between the surfaces of the slider 25 and the surfaces of the first and second cases 22 and 23 which form the fluid chamber 24. The choke restricts the passage of fluid between the chambers 24a and 24b. It should be noted that, as depicted in cross-section in FIG. 2, the choke C1 is defined on all four sides of the slider 25. The extend of fluid flow between any one side of the slider 25 and the corresponding surface of the chamber 24 is dependent upon many factors such as centrifugal forces, the wear on any one surface, etc. Accordingly, the choke C1 is not necessarily limited to include all four sides of the slider 25 and its interaction with the surfaces of the chamber 24. Rather, the choke C1 could be along one, two, three or all four of the surfaces of the slider 25.

Raised parts 20c and 21c are formed in radially inner portions of the first side plate 20 and the second side plate 21. In addition, a window hole 12b is formed in a radially outer portion of the driven plate 12. A torsion spring 30 is supported by the raised parts 20c and 21c and the window hole 12b. The torsion spring 30 forms an elastic connecting mechanism 13.

A projection 12a projected outward is formed in a radially outer end of the driven plate 12. This projection 12a further extends radially outward through the clearance opening 29 formed between the lower walls 22a and 23a of the first case 22 and the second case 23, and is projected into the fluid chamber 24. The projection 12a is inserted into the notch 25a of the slider 25. Both the slider 25 and the driven plate 12 are thus circumferentially moved in the fluid chamber 24.

Figure 8:
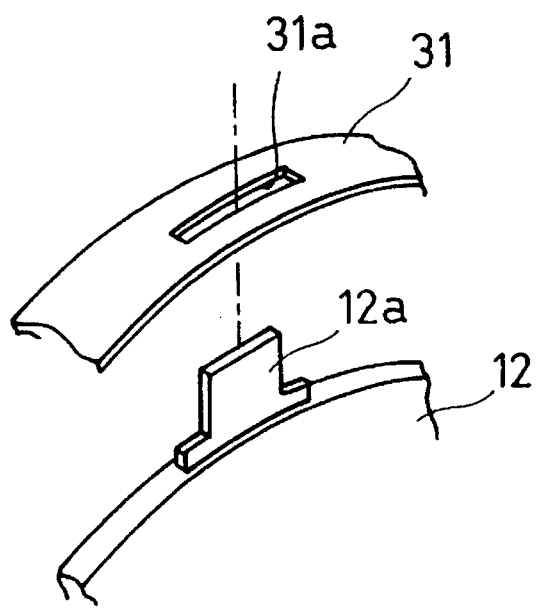
FIG. 8 is a partial perspective view showing a driven plate and a seal of the torsional vibration damping device of the present invention.

Furthermore, a seal band 31 is wound around the radially outer end of the driven plate 12, as shown in FIG. 8. The seal band 31 is provided with a notch 31a in a position corresponding to the projection 12a of the driven plate 12, and the projection 12a of the driven plate 12 is inserted through the notch 31a. The seal band 31 is slidably disposed between both the cases 22 and 23 and both the side plates 20 and 21, to seal the clearance 29 formed between the lower walls 22a and 23a of both the cases 22 and 23.

When an engine connected to the torque converter 1 is engaged to produce torque, the torque is transmitted to the front cover 4. The impeller 5, together with the front cover 4, is rotated, whereby hydraulic fluid flowing from the impeller 5 causes the turbine 6 to rotate. The flow of the hydraulic fluid which is returned to the impeller 5 from the turbine 6 is adjusted by the stator 7. The rotation of the turbine 6 is transmitted to an input shaft (not shown) of an automatic transmission (not shown) through the turbine hub 8.

When the input shaft of the transmission reaches a predetermined speed of rotation, the oil pressure within the torque converter 1 increases. At a predetermined point, the fluid pressure between the front cover 4 and the piston 11 is released due to pressure control means disposed within the transmission (not shown). As a result, the piston 11 is pressed against the front cover 4. As the friction member 15 of the piston 11 presses against the friction surface 4b of the front cover 4, the rotation of the front cover 4 is mechanically transmitted to the turbine hub 8 through lock-up device 3. Specifically, power is transmitted through a path defined by the front cover 4, the piston 11, the side plates 20 and 21, the elastic connecting mechanism 13, the driven plate 12 and the hub 8. The radially outer projections 20b and 21b of the side plates 20 and 21 are engaged with the notch 11b of the piston 11, and both the side plates 20 and 21 and the torsional vibration damping device 14 are connected to each other by the stud pin 28. Consequently, the torque from the engine is transmitted through the torsional vibration damping device 14.

At the time of the above described locking operation, the torque vibration on the engine side of the torque converter 1 is transmitted to the lock-up device 3. While transmitting the torsional vibration, relative rotation is produced between the first and second side plates 20 and 21 and the driven plate 12, causing the torsional vibration damping device 13 to operate.

Description is now made of hysteresis torque experienced when the slider 25 undergoes movement within the fluid chamber 24 in the torsional vibration damping device 14.

It is assumed that the cases 22 and 23 are rotated toward R1 relative to the slider 25 from a neutral position shown in FIG. 3. Consequently, the area of the division chamber 24a is decreased, whereby the hydraulic fluid in the division chamber 24a flows into the division chamber 24b through the clearance (choke) between the slider 25 and the inner surfaces of the cases 22 and 23. At this time, hysteresis torque is produced by the resistance to fluid flow through the choke, damping the torsional vibration. The same is true for the time when the cases 22 and 23 are rotated toward R2.

When vibrations are being damped by the slider 25 and the chamber 24 formed by the cases 22 and 23, the pressure of the hydraulic fluid produced in the fluid chamber 24 is exerted on both of the side plates 20 and 21 through the side walls of the respective cases 22 and 23. The stud pin 28 maintains the spacing between the side plates 20 and 21 at a fixed distance. Thus, the side plates 20 and 21 are prevented from axially spreading, thereby to make it possible to prevent the area of the choke from being changed in the axial direction.

On the other hand, if fluid pressure of the hydraulic fluid is exerted on the radially outer portion, the upper wall 23b of the second case 23 and the upper wall 22b of the first case 22 are pressed against each other, whereby the sealing properties are enhanced, thereby to make it possible to prevent the leakage of the fluid in this direction. In addition, with respect to the radially inner portion, the lower walls 22b and 23a of the respective cases 22 and 23 are pressed against the seal band 31, whereby the sealing properties in this direction are also enhanced. Therefore, it is possible to restrain the leakage of the fluid from the radially outer and inner portions.

In the construction according to the present embodiment, therefore, the clearance between the cases 22 and 23 constituting the fluid chamber 24 and the side plates 20 and 21 is decreased as the pressure of the hydraulic fluid is increased, whereby the sealing properties are enhanced. Therefore, desired hysteresis torque is obtained.

Although in the above described embodiment, the present invention is applied to the torsional vibration damping device of the torque converter, the present invention may be applied to a torsional vibration damping device of a power transmitting apparatus other than the torque converter.

Various details of the invention may be changed without departing from its spirit nor its scope. Furthermore, the foregoing description of the embodiment according to the present invention is provided for the purpose of illustration only, and not for the purpose of limiting of the invention as defined by the appended claims and their equivalents.

What is claimed is:

1. A torque converter having a vibration damping mechanism comprising:

a fluid filled torque converter housing having relatively rotatable input and output members;

at least a first housing member coupled to said output member for limited rotary displacement therewith, said first housing member partially defining an annular chamber;

first and second case members disposed within said annular chamber having overlapping portions defining an arcuate fluid chamber having a plurality of inner surfaces; and at least one restraining member connected to said first housing member for maintaining said first and second case members in generally constant engagement with one another;

a slider element slidably disposed within said arcuate fluid chamber and coupled to said output member for movement therewith, said slider dividing said arcuate fluid chamber into two sub-chambers, said slider slideable within said arcuate fluid chamber, at least one surface of said slider and at least one of said inner surfaces defining a choke for restricting fluid flow between said sub-chambers in response to rotary displacement between said first housing member and said output member;

a lock-up member coupled to said first housing member to rotate therewith and selectively engagable with said input member; and an annular seal member disposed proximate said slider, between said case members and said output member for sealing fluid within said sub-chambers.

2. The torque converter as set forth in claim 1 wherein said annular seal member is disposed on an outer radial portion of a driven plate proximate said case members, said driven plate formed with a plurality of projections said seal member being formed with a plurality of apertures through which each of a corresponding one of said driven plate projections extends for sealing fluid within said sub-chambers, said driven plate connected to said output member.

3. The torque converter as set forth in claim 2 wherein said annular seal member is disposed radially outward of said driven, plate and radially inward of said first and second case members within said annular chamber.

4. A torque converter having a vibration damping mechanism comprising:

a fluid filled torque converter housing having an impeller and a turbine disposed therein, said impeller connected to said torque converter housing for rotation therewith, said turbine rotatably disposed adjacent to said impeller;

a driven plate connected to said turbine, said plate having a plurality of radial projections formed on an outer circumferential edge;

a first and second housing member coupled to said driven plate member for limited rotary displacement, portions of said housing members partially defining an annular chamber;

a first set of case members and a second set of case members disposed within said annular chamber, each corresponding pair of one first case member and one second case member each having overlapping portions defining an arcuate fluid chamber, each arcuate chamber having a plurality of inner surfaces;

a plurality of slider elements, one slider element slidably disposed within each of said arcuate fluid chamber dividing said arcuate fluid chamber into two sub-chambers, each of said projections engaging one of said sliders, and at least one surface of each of said sliders and at least one corresponding inner surface of said arcuate chamber defining a choke for restricting fluid flow between said sub-chambers in response to rotary displacement between said housing members and said driven plate;

a lock-up member coupled to said housing members to rotate therewith and selectively engagable with said torque converter housing; and an annular seal member disposed on an outer radial portion of said driven plate proximate said case members, said seal member being formed with a plurality of apertures through which each of a corresponding one of said driven plate projections extends for sealing fluid within said sub-chambers.

5. The torque converter as set forth in claim 4 wherein said annular seal member is disposed radially outward of said driven plate and radially inward of said first and second sets of case members within said annular chamber.

* * * * *